United States Patent
Savary et al.

(10) Patent No.: US 9,475,726 B2
(45) Date of Patent: Oct. 25, 2016

(54) PROCESS FOR MANUFACTURING A GLASS SUBSTRATE COMPRISING PRINTED ENAMEL PATTERNS

(75) Inventors: Jean-Philippe Savary, Northfield, MN (US); André Beyrle, Tracy le Val (FR); Kamel Chahboune, Soissons (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 31 days.

(21) Appl. No.: 14/126,755

(22) PCT Filed: Jun. 15, 2012

(86) PCT No.: PCT/FR2012/051355
§ 371 (c)(1),
(2), (4) Date: Dec. 19, 2013

(87) PCT Pub. No.: WO2012/172269
PCT Pub. Date: Dec. 20, 2012

(65) Prior Publication Data
US 2014/0120252 A1    May 1, 2014

(30) Foreign Application Priority Data

Jun. 17, 2011 (FR) ...................................... 11 55312

(51) Int. Cl.
*B05D 5/06* (2006.01)
*C03C 17/00* (2006.01)
*B41M 1/12* (2006.01)
*B41M 1/34* (2006.01)
*C03C 8/14* (2006.01)
*C03C 17/34* (2006.01)

(52) U.S. Cl.
CPC .............. *C03C 17/008* (2013.01); *B41M 1/12* (2013.01); *B41M 1/34* (2013.01); *C03C 8/14* (2013.01); *C03C 17/002* (2013.01); *C03C 17/34* (2013.01); *C03C 17/3411* (2013.01); *C03C 2217/72* (2013.01)

(58) Field of Classification Search
CPC ... C03C 17/008; C03C 17/34; C03C 17/002; C03C 17/3411; C03C 8/14; C03C 2217/72; B41M 1/12; B41M 1/34
USPC .................................................. 427/160–169
See application file for complete search history.

(56) References Cited

U.S. PATENT DOCUMENTS

| 4,321,778 A | 3/1982 | Whitehead |
| 2006/0150680 A1* | 7/2006 | Hill et al. ...................... 65/60.2 |
| 2008/0210122 A1* | 9/2008 | Magdassi et al. ......... 106/31.05 |

FOREIGN PATENT DOCUMENTS

| DE | 102007008443 | 8/2008 |
| WO | WO 2004/030935 | 4/2004 |
| WO | WO 2006/064079 | 6/2006 |

OTHER PUBLICATIONS

Ceramic Pigments, http://www.ceramicindustry.com/articles/90449-ceramic-pigments , accessed online Jan. 22, 2016.*
International Search Report as issued for International Application No. PCT/FR2012/051355, dated Sep. 27, 2012.

* cited by examiner

*Primary Examiner* — Michael Wieczorek
*Assistant Examiner* — Michael G Miller
(74) *Attorney, Agent, or Firm* — Pillsbury Winthrop Shaw Pittman LLP

(57) ABSTRACT

A process for manufacturing a one-way vision glass pane, the process including: a) depositing a layer of a compound comprising a mineral pigment over an area of the pane, the compound being free of glass frit; b) depositing a layer of an enamel compound including a glass frit and a mineral pigment of a different color to the pigment of a), by screen printing, in the shape of the one or more desired patterns; c) heating the coated pane to a temperature high enough to bake the enamel; and d) removing pigments that have not been fixed by the enamel, wherein the particles of the pigments and the particles of the glass frits are of similar size, and the thickness of the layer of the deposited enamel compound is larger than the thickness of the pigment layer deposited in a).

27 Claims, No Drawings

PROCESS FOR MANUFACTURING A GLASS SUBSTRATE COMPRISING PRINTED ENAMEL PATTERNS

CROSS-REFERENCE TO RELATED APPLICATIONS

This application is the U.S. National Stage of PCT/FR2012/051355, filed Jun. 15, 2012, which in turn claims priority to French Application No. 1155312, filed Jun. 17, 2011. The content of both applications are incorporated herein by reference in their entirety.

The present invention relates to the field of printed glass substrates comprising enamel-based patterns.

Printed glass substrates are used in various applications, especially in glazing units for industrial, office or residential buildings or for automobiles, for decorative and/or functional purposes. The present invention is more particularly related to the field of one-way vision glazing, which can be seen through in only one direction, thus an observer located inside a building will have an unobstructed view of the exterior of said building and will be unable to see into the building if located on the other side of the glazing unit.

Such glazing units are generally obtained by applying a first enamel layer, of a color other than black, directly to the glass substrate, in the shape of the desired patterns, then depositing black pigments over all of the patterns and finally heating the substrate to a temperature at which the enamel bakes. During the step of baking the enamel, the glass frit softens and bonds to the glass of the substrate, thereby retaining the black pigments. After the bake, the pigments deposited outside of the patterns, and not fixed by the enamel, are removed using an appropriate treatment, for example by vacuum suction or by applying an air or water jet.

The aforementioned process is described in US 2006/0150680, in which it is referred to as the "top print pattern", along with other embodiments in which the ceramic ink (especially black pigments) containing no glass frit is applied to the glass substrate either on the surface of one or more layers ("top print pattern") or between other layers ("intermediate print pattern").

However, the "top print pattern" process is not completely satisfactory. It has been observed that it gives colors that lack vividness. In particular, the migration of black pigments into a layer of a light color such as white causes the white to be perceived as being slightly grey. In addition, the use of a low fusibility glass frit, required to prevent the black pigments from penetrating too deeply into the light layer, means that baking must be carried out at relatively high temperatures.

The object of the present invention is to improve the process for manufacturing a one-way vision glass pane comprising one or more separate enamel patterns composed of a number of exactly aligned layers, process in which:

a) at least one layer of a compound comprising at least one mineral pigment is deposited over all or part of the area of the pane, said compound being free of glass frit;

b) at least one layer of an enamel compound comprising at least one glass frit and at least one mineral pigment of a different color to the pigment of step a) is deposited, by screen printing, in the shape of the one or more desired patterns;

c) the pane coated with said layers is heated to a temperature high enough to bake the enamel; and d) pigments that have not been fixed by the enamel, which pigments are located outside of the one or more patterns, are removed, characterized in that the particles of the one or more pigments and the particles of the one or more glass frits are of similar size, especially having a particle size distribution such that 50% of the particles are smaller than 7 μm in size and preferably smaller than 5 μm in size, and in that the thickness of the layer of an enamel compound deposited in step b) is larger than the thickness of the pigment layer deposited in step a), the enamel layer deposited in step b) being between 20 and 100 μm in thickness and the pigment layer deposited in step a) being between 4 and 15 μm in thickness.

The thicknesses of the enamel layer deposited in step b) and of the pigment layer deposited in step a) are given for wet layers, i.e. for layers before baking or heating.

The pigment layer of step a) may be deposited by any means known to a person skilled in the art, especially by flat or rotary screen printing.

The mineral pigment is preferably chosen from pigments that impart a black color after step c). By way of example, mention may be made of pigments based on chromium, iron, manganese, copper and/or cobalt, especially in the form of oxides or sulfides. Although chromium-based pigments impart an intense black color, they are not preferred because they cause problems related to their potential toxicity and their recycling. Thus the mineral pigment is preferably chromium free.

Advantageously, the black mineral pigment has a lightness $L^*$, such as defined in the CIE (1931) Lab color space, that is 15 or less and preferably 10 or less, as measured for the final glass pane.

When the deposition is carried out by screen printing, the pigment is generally mixed with an organic medium allowing the viscosity to be adjusted in order for the mixture to be able to pass through the meshes of the screen printing screen correctly. The viscosity of the mixture generally ranges from 80 to 120 poises and is preferably about 100 poises.

The organic medium also has the function of temporally fixing the pigments until the following layer of enamel compound is applied.

The organic medium must be removed at the start of step c) of baking the enamel in order to stop pores and cracks appearing in the final enamel. It is generally an organic solvent, preferably based on a mixture of "heavy" or terpene alcohols ("pine oil"), possibly associated with one or more resins that increase the strength with which the pigment is temporarily fixed to the surface of the pane.

Preferably, the thickness of the pigment layer deposited on the glass pane is at most equal to 10 μm and preferably ranges from 6 to 10 μm. This thickness corresponds to that of the wet layer, i.e. before heating or baking.

The enamel compound according to the invention is deposited by screen printing.

Screen printing is a well-known printing technique that uses a screen printing screen consisting of a fabric on which the pattern(s) to be printed is (are) reproduced and a doctor blade allowing enough shear force to be applied to make the enamel compound pass through meshes in the screen in openings corresponding to the pattern(s) to be printed, and to deposit said enamel compound on a substrate.

The screen printing screen must have a mesh size compatible with the size of the particles contained in the enamel compound. The filaments forming said screen may be steel filaments or filaments made of a polymer, for example of polyester. The number of filaments per centimeter generally ranges from 120 to 180 and is preferably about 150. Preferably, the filament diameter ranges from 25 to 35 µm.

The enamel compound to be screen printed is obtained by mixing the glass frit and the mineral pigment with an organic medium such as defined above.

The expression "glass frit" is understood to mean an oxide-based vitrifiable compound in the form of a powder. According to the invention, the glass frit takes the form of particles having a comparable size to that of the particles of pigments used in step a) and step b). By virtue of the small size of its particles, moreover in combination with a low softening temperature, the glass frit may easily migrate toward the surface of the pane and envelope the pigments, which are thus securely and durably fixed to the glass.

The glass frit according to the invention is free of lead oxide PbO for reasons related to protection of the environment.

Preferably, the glass frit is a borosilicate based on bismuth oxide $Bi_2O_3$ and/or zinc oxide ZnO.

For example, the $Bi_2O_3$-based glass frit contains 35 to 75% wt % of $SiO_2$ and 20 to 40 wt % of $Bi_2O_3$ and advantageously 25 to 30 wt %.

Such a glass frit has a softening temperature that ranges from 550 to 580° C. and that is preferably equal to 568° C.

For example, the ZnO-based glass frit contains 35 to 75 wt % of $SiO_2$ and 4 to 10 wt % of ZnO.

Such a glass frit has a softening temperature below 600° C. and that ranges from 560 to 590° C. and that is preferably equal to 577° C.

As mentioned above, the mineral pigment has a different color from the pigment used in step a) and preferably imparts a color other than black.

Preferably, the pigment is chosen such that it has a white color after step c). This pigment is especially titanium oxide $TiO_2$.

Advantageously, the white mineral pigment has a lightness L*, such as defined in the CIE (1931) Lab color space, that ranges from 65 to 85, as measured for the final glass pane.

The pigment may be of a color other than white, and is for example based on $Cr_2O_3$ (green color), $Co_3O_4$ (blue color) or $Fe_2O_3$ (orange color).

The proportion of pigments in the glass frit compound ranges from 5 to 25 wt % and preferably from 10 to 20 wt %.

The viscosity of the mixture comprising the glass frit, the mineral pigment and the organic medium generally ranges from 100 to 300 poises, preferably 180 to 200 poises.

The thickness of the enamel layer deposited on the pigment layer preferably ranges from 30 to 80 µm and more preferably from 40 to 80 µm. This thickness corresponds to that of the wet enamel layer, i.e. before heating or baking.

In step c), the glass pane is treated at what is called a "baking" temperature that melts the glass frit so as to form a glass layer that fixes the pigments to the surface of the pane. In the enamel field, the baking temperature is the minimum temperature at which "sufficient" fritting of the enamel compound is observed, this sufficient fritting especially resulting in strong bonding to the glass of the pane. A person skilled in the art will be able to determine this baking temperature, for example by passing a pen comprising a metal point connected to a spring that delivers a force of 20 newtons over the surface of the enamel (after the latter has been heated to the treatment temperature and cooled) and noting the lowest treatment temperature for which the enamel cannot be scratched off the glass.

The baking temperature must be sufficiently high to bake the glass frit and optionally temper the glass, but not too high in order for the glass sheet not to be visibly deformed, undesirably. In general, the baking temperature ranges from 620 to 700° C. and preferably from 640 to 660° C.

In step d), the pigments that are located outside of the screen printed patterns and that are not fixed by the enamel are removed. They may be removed by any known, for example mechanical, means, especially by wiping with a cloth, dry or wet brushing or using a water jet.

An additional pigment layer having a different color to the pigments present in the first layer and the enamel layer may optionally be applied to the enamel layer before step c). This additional layer is generally applied such that it partially covers the surface of the enamel layer, thereby allowing production of relatively complex polychromatic patterns.

If required, after a layer has been deposited and before the following layer is applied, it is possible to carry out a heat treatment thereon with a view to reducing the amount of organic medium present. The temperature of the heat treatment generally ranges from 70 to 150° C., and preferably is at least equal to 140° C. The treatment may be carried out using a method known to a person skilled in the art, for example by means of infrared lamps.

The printed glass pane obtained is noteworthy in that the pigments in the patterns form separate layers. In particular it has been observed that there is no migration of the pigments, only migration of the glass frit, which, by melting, fixes the pigments to the surface of the glass pane. The colors of the opposite faces of the patterns remain pure and not tinted by possible mixing of the pigments.

The printed glass pane obtained by the process according to the invention may be used alone. In this case it is preferable for the pane to have been heat treated beforehand under temperature conditions that at least toughen and preferably temper the final glass, in order for said pane to be completely safe to use.

The glass pane obtained by the process according to the invention may be made of any type of glass, for example soda-lime-silica glass, especially obtained by the float process. As a general rule it is a glass sheet the thickness of which may vary to a large extent depending on the intended application. By way of indication, for a pane intended to be used in an architectural glazing unit, this thickness ranges from 2 to 20 mm and preferably from 4 to 12 mm.

Preferably, in particular for user safety reasons, the glass pane is associated with one or more glass sheets, especially according to the definition given above, by way of one or more sheets of a thermoplastic having hot-melt adhesive properties, so as to form a laminated glass pane.

By way of examples of thermoplastic sheets, mention may be made of sheets of polyvinyl butyral (PVB), ethylene vinyl acetate (EVA), polyurethane or polycarbonate.

The number of glass sheets in the laminated pane depends on its size and the mechanical stress to which it is subjected. In general, the laminated pane comprises at most 6 glass sheets, including the printed glass pane, and preferably 2 to 4 glass sheets.

The printed pane and the glass sheets are associated with the thermoplastic sheets by known methods, especially using an oven.

The invention is illustrated by means of the following nonlimiting examples. In these examples, the following measurements were made:
  the size distribution of the particles was measured using a laser diffraction analyzer (Malvern Mastersizer MS2000);

the average thickness of the layers was measured by sweeping the surface to be tested with a laser perthometer (Mahr LS10); and the lightness L* was measured under CIE (1931) standard conditions under illuminant $D_{65}$ with a 10° observer in the diffuse SCE (specular component excluded) mode at 8° (CM 600 Minolta).

EXAMPLE 1

A first layer of a compound comprising chromium-free black pigments (sold under the reference VV31/60/2 by Pemco) and an organic medium (sold under the reference 243 by Pemco) in an amount allowing a viscosity of about 90 poises (measured using a Haake VT550 viscometer—rotation speed 23.2 rpm) was deposited by screen printing on one side of a soda-lime-silica glass pane.

The black pigments had a size distribution such that 50% of the particles were smaller than 4 µm in size and 90% of these particles were smaller than 6 µm in size.

The average thickness of the (wet) pigment layer deposited on the glass was equal to 6 µm.

Next, a second layer of an enamel compound comprising a glass frit and $TiO_2$ pigments (sold under the reference TDF 9070 by Ferro) and an organic medium (sold under the reference 801022 by Ferro) in an amount allowing a viscosity of 200 poises (measured under the aforementioned conditions) to be obtained was deposited by screen printing.

The glass frit had a particle size distribution such that 50% of the particles were smaller than 5 µm in size and 90% of these particles were smaller than 8 µm in size.

The glass frit had the following composition (in percentage by weight): 54% $SiO_2$, 28.5% $Bi_2O_3$, 8% $Na_2O$, 3.5% $Al_2O_3$ and 3% $TiO_2$, the remainder consisting of BaO, CaO, $K_2O$, $P_2O_5$, SrO and ZnO.

The screen printing screen consisted of a fabric of polyester filaments that were 27 µm in diameter, the fabric comprising 150 filaments/cm, which screen allowed a number of 2 mm-diameter circular patterns to be formed, these patterns being distributed such that the degree of coverage was equal to 55%.

The average thickness of the (wet) enamel layer deposited on the glass was equal to 50 µm.

After each layer was deposited, the glass pane was introduced into a drying device equipped with infrared lamps operating at a temperature of about 145 to 155° C. in order to remove the organic medium and consolidate the layers. The average thickness of the pigment layer and the enamel layer was equal to 1 µm and 30 µm, respectively.

The pane was then heated to a temperature of 655° C. in an oven in order to make the glass frit melt and form the enamel in which the pigments were embedded. After baking, the average thicknesses of the pigment layer and the enamel layer were equal to about 1 µm and 23.5 µm, respectively.

The pigments that were not fixed to the pane were removed by brushing and washing in water.

For the pane obtained, the lightness was measured for the black patterns (through the glass) and for the white patterns (on the opposite side).

The value of L* was less than 10 on the black side and greater than 75 on the white side.

EXAMPLE 2

Comparative Example

The procedure followed was the same as in example 1 except that a layer of the enamel compound was deposited first, by screen printing using the pattern-bearing screen, and then a layer of the compound of black pigments was deposited, by screen printing using the same screen. The layers were deposited such that they were superposed in exact alignment.

The L* value was equal to 26 on the black side and equal to 55 on the white side.

EXAMPLE 3

Comparative Example

The procedure followed was the same as in example 1. The average thickness of the (wet) pigment layer deposited on the glass was equal to 20 µm.

The average thickness of the (wet) enamel layer deposited on the glass was equal to 50 µm.

Following the deposition of each layer, the glass pane was introduced into a drying device equipped with infrared lamps operating at a temperature of about 145 to 155° C. in order to remove the organic medium and consolidate the layers. The pane was then heated to a temperature of 655° C. in an oven in order to make the glass frit melt and form the enamel in which the pigments were embedded. After baking, the average thicknesses of the pigment layer and the enamel layer were equal to 2.6 µm and 21 µm, respectively. The pigments that were not fixed to the pane were removed by brushing and washing in water.

In this configuration, the pigments were not fixed to the glass and all of the printing was removed from the glass since adhesion was not possible.

EXAMPLE 4

Comparative Example

The procedure followed was the same as in example 1. The average thickness of the (wet) pigment layer deposited on the glass was equal to 7 µm.

The average thickness of the (wet) enamel layer deposited on the glass was equal to 15 µm.

Following the deposition of each layer, the glass pane was introduced into a drying device equipped with infrared lamps operating at a temperature of about 145 to 155° C. in order to remove the organic medium and consolidate the layers. The pane was then heated to a temperature of 655° C. in an oven in order to make the glass frit melt and form the enamel in which the pigments were embedded. After baking, the average thicknesses of the pigment layer and the enamel layer were equal to about 0.33 µm and 6 µm, respectively.

The pigments that were not fixed to the pane were removed by brushing and washing in water.

For the pane obtained, the lightness was measured for the black patterns (through the glass) and for the white patterns (on the opposite side).

The value of L* was less than 10 on the black side and between 55 and 60 on the white side. The "white" side thus appeared grey.

EXAMPLE 5

The procedure followed was the same as in example 1. The average thickness of the (wet) pigment layer deposited on the glass was equal to 7 µm.

Next, a second layer of an enamel compound comprising a glass frit and colored pigments (of colors other than white)

and an organic medium (sold under the reference 801022 by Ferro) was deposited by screen printing.

The average thickness of the (wet) colored enamel layer deposited on the glass was equal to 47 µm.

Following the deposition of each layer, the glass pane was introduced into a drying device equipped with infrared lamps operating at a temperature of about 145 to 155° C. in order to remove the organic medium and consolidate the layers. The pane was then heated to a temperature of 655° C. in an oven in order to make the glass frit melt and form the enamel in which the pigments were embedded. After baking, the average thicknesses of the pigment layer and the enamel layer were equal to about 1 µm and 23.5 µm, respectively.

The pigments that were not fixed to the pane were removed by brushing and washing in water.

For the pane obtained, the lightness was measured for the black patterns (through the glass).

The value of L* was less than 10.

The invention claimed is:

1. A process for manufacturing a one-way vision glass pane comprising one or more separate enamel patterns composed of a number of exactly aligned layers, the process comprising:
    a) depositing at least one layer of a compound comprising at least one mineral pigment over all or part of the area of the pane, said compound being free of glass frit;
    b) depositing, after step a), at least one layer of an enamel compound comprising at least one glass frit and at least one mineral pigment of a different color to the at least one pigment of step a), by screen printing, in the shape of the one or more desired patterns;
    c) heating the pane coated with said layers to a temperature high enough to bake the enamel; and
    d) removing pigments that have not been fixed by the enamel, which pigments are located outside of the one or more patterns,
    wherein the particles of the one or more pigments and the particles of the one or more glass frits have a particle size distribution such that 50% of the particles are smaller than 7 µm in size, and wherein the thickness of the layer of the enamel compound deposited in step b) is larger than the thickness of the pigment layer deposited in step a), the enamel layer deposited in step b) being between 40 and 80 µm in thickness and the pigment layer deposited in step a) being between 4 and 15 µm in thickness.

2. The process as claimed in claim 1, wherein the pigment layer deposited in step a), before baking, is at most equal to 10 µm in thickness.

3. The process as claimed in claim 2, wherein the pigment layer deposited in step a), before baking, ranges from 6 to 10 µm in thickness.

4. The process as claimed in claim 1, wherein the mineral pigment of step a) is chosen from pigments that impart a black color after step c).

5. The process as claimed in claim 4, wherein the pigment is based on chromium, iron, manganese, copper and/or cobalt.

6. The process as claimed in claim 5, wherein the chromium, iron, manganese, copper and/or cobalt are in the form of oxides or sulfides.

7. The process as claimed in claim 1, wherein the glass frit is free of lead oxide (PbO).

8. The process as claimed in claim 7, wherein the glass frit is a borosilicate based on bismuth oxide ($Bi_2O_3$) and/or zinc oxide (ZnO).

9. The process as claimed in claim 8, wherein the glass frit contains 35 to 75 wt % of $SiO_2$ and 20 to 40 wt % of $Bi_2O_3$, or 4 to 10 wt % of ZnO.

10. The process as claimed in claim 9, wherein the glass frit contains 35 to 75 wt % of $SiO_2$ and 25 to 30 wt % of $Bi_2O_3$.

11. The process as claimed in claim 8, wherein the $Bi_2O_3$-comprising glass frit has a softening temperature that ranges from 550 to 580° C., and the ZnO-comprising frit has a softening temperature below 600° C.

12. The process as claimed in claim 11, wherein the $Bi_2O_3$-comprising glass frit has a softening temperature that is equal to 568° C.

13. The process as claimed in claim 1, wherein the pigment of step b) is chosen from pigments that impart a white color after c), said pigment being based on $TiO_2$.

14. The process as claimed in claim 1, wherein the pigment used in step b) is of a color other than white, and is based on $Cr_2O_3$, $CO_3O_4$ or $Fe_2O_3$.

15. The process as claimed in claim 1, wherein the proportion of pigments in the enamel compound of step b) ranges from 5 to 25 wt %.

16. The process as claimed in claim 15, wherein the proportion of pigments in the enamel compound of step b) ranges from 10 to 20 wt %.

17. The process as claimed in claim 1, wherein the particles of the one or more pigments and the particles of the one or more glass frits have a particle size distribution such that 50% of the particles are smaller than 5 µm in size.

18. The process as claimed in claim 10, wherein the mineral pigment of the enamel in step b) imparts a color other than black.

19. The process as claimed in claim 1, wherein the mineral pigment of the layer deposited in step a) has a lightness L*, defined in the CIE (1931) Lab color space, that is 10 or less as measured after manufacturing the one-way vision glass pane.

20. The process as claimed in claim 19, wherein the mineral pigment of the layer deposited in step b) has a lightness L*, defined in the CIE (1931) Lab color space, that is between 70 and 85 as measured after manufacturing the one-way vision glass pane.

21. The process as claimed in claim 1, wherein the at least one mineral pigment deposited in step a) has a particle size distribution such that 50% of particles are smaller than 4 µm in size and 90% of the particles are smaller than 6 µm in size and wherein the at least one glass frit has a particle size distribution such that 50% of the particles are smaller than 5 µm in size and 90% of the particles are smaller than 8 µm in size.

22. A process for manufacturing a one-way vision glass pane comprising one or more separate enamel patterns including a plurality of layers, the process comprising:
    depositing a first layer of a compound comprising a mineral pigment over an area of the pane, said compound being free of glass frit;
    after depositing the first layer, depositing a second layer of an enamel compound comprising a glass frit and a mineral pigment of a different color from the pigment of the first layer, by screen printing, in the shape of the one or more patterns;
    heating the pane coated with said first and second layers to a temperature high enough to bake the enamel; and
    removing pigments that have not been fixed by the enamel, which pigments are located outside of the one or more patterns, wherein the particles of said pigments and the particles of the glass frit have a particle size distribution such that 50% of the particles are smaller than 7 µm in size, wherein the thickness of the second layer is larger than the thickness of the first layer, the second layer being between 40 and 80 µm in thickness and the first payer being between 4 and 15 µm in thickness, wherein the mineral pigment of the first layer is chosen from pigments that impart a black color after the heating and wherein the mineral pigment of the second layer is chosen from pigments that impart a white color after the heating.

23. The process as claimed in claim 22, wherein the mineral pigment of the first layer is based on chromium, iron, manganese, copper and/or cobalt.

24. The process as claimed in claim 22, wherein the mineral pigment of the second layer is based on $TiO_2$.

25. The process as claimed in claim 22, wherein the mineral pigment of the first layer has a lightness L*, defined in the CIE (1931) Lab color space, that is 10 or less as measured after manufacturing the one-way vision glass pane.

26. The process as claimed in claim 25, wherein the mineral pigment of the second layer has a lightness L*, defined in the CIE (1931) Lab color space, that is between 70 and 85 as measured after manufacturing the one-way vision glass pane.

27. The process as claimed in claim 22, wherein the pigment of the first layer has a particle size distribution such that 50% of particles are smaller than 4 µM in size and 90% of the particles are smaller than 6 µm in size and wherein the glass frit has a particle size distribution such that 50% of the particles are smaller than 5 µm in size and 90% of the particles are smaller than 8 µm in size.

* * * * *